United States Patent [19]

Hirohata

[11] Patent Number: 4,688,695

[45] Date of Patent: Aug. 25, 1987

[54] MECHANISM FOR OPENING AND CLOSING A LID

[75] Inventor: Toshio Hirohata, Yokohama, Japan

[73] Assignee: Nifco Inc., Yokohama, Japan

[21] Appl. No.: 787,268

[22] Filed: Oct. 15, 1985

[30] Foreign Application Priority Data

Oct. 23, 1984 [JP] Japan .......................... 59-159173[U]

[51] Int. Cl.⁴ .................... B65D 43/18; G11B 15/675; E05F 1/10; E05B 65/06
[52] U.S. Cl. .................................... 220/336; 49/364; 49/371; 49/379; 49/386; 49/394; 292/DIG. 4; 360/96.6; 369/75.2
[58] Field of Search ...................... 369/75.2; 360/96.6; 49/364, 371, 379, 381, 386, 394; 220/334, 336; 292/DIG. 4

[56] References Cited

U.S. PATENT DOCUMENTS

| 2,535,639 | 12/1950 | Lauer | 292/DIG. 4 |
| 3,820,866 | 6/1974 | Kaldenberg | 49/386 |
| 3,854,784 | 12/1974 | Hunt et al. | 292/DIG. 4 |
| 4,325,091 | 4/1982 | Uchida | 360/96.6 |
| 4,365,525 | 12/1982 | Imazaike | 360/96.6 |
| 4,378,066 | 3/1983 | Sato et al. | 220/336 |
| 4,470,220 | 9/1984 | Sudo | 49/379 |
| 4,561,084 | 12/1985 | Satake et al. | 369/75.2 |

FOREIGN PATENT DOCUMENTS 0029174  2/1983  Japan .............................. 360/96.6

Primary Examiner—Steven L. Stephan
Attorney, Agent, or Firm—Trexler, Bushnell, Giangiorgi & Blackstone, Ltd.

[57] ABSTRACT

A mechanism for opening and closing a lid is disclosed, which includes a rotary damper and an auxiliary rotary damper. An input gear of the rotary damper is in mesh with an output gear of a lid. An input gear of the auxiliary rotary damper is in mesh with the output gear of the lid or the input gear of the rotary damper. Thus, the lid can be sufficiently braked during the opening and closing operations.

5 Claims, 8 Drawing Figures

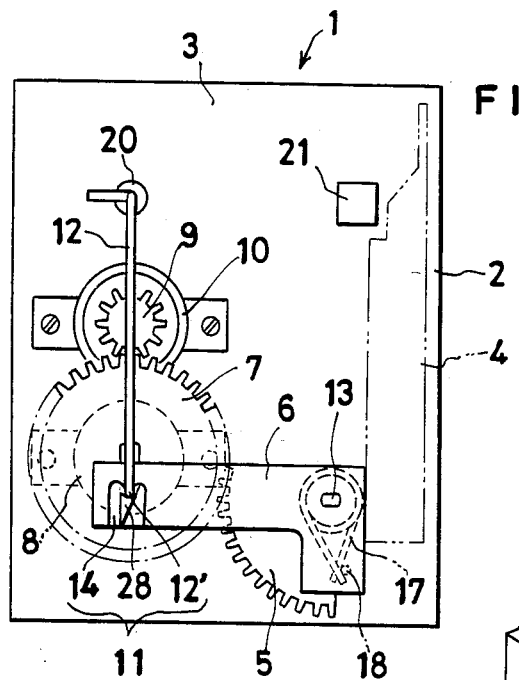
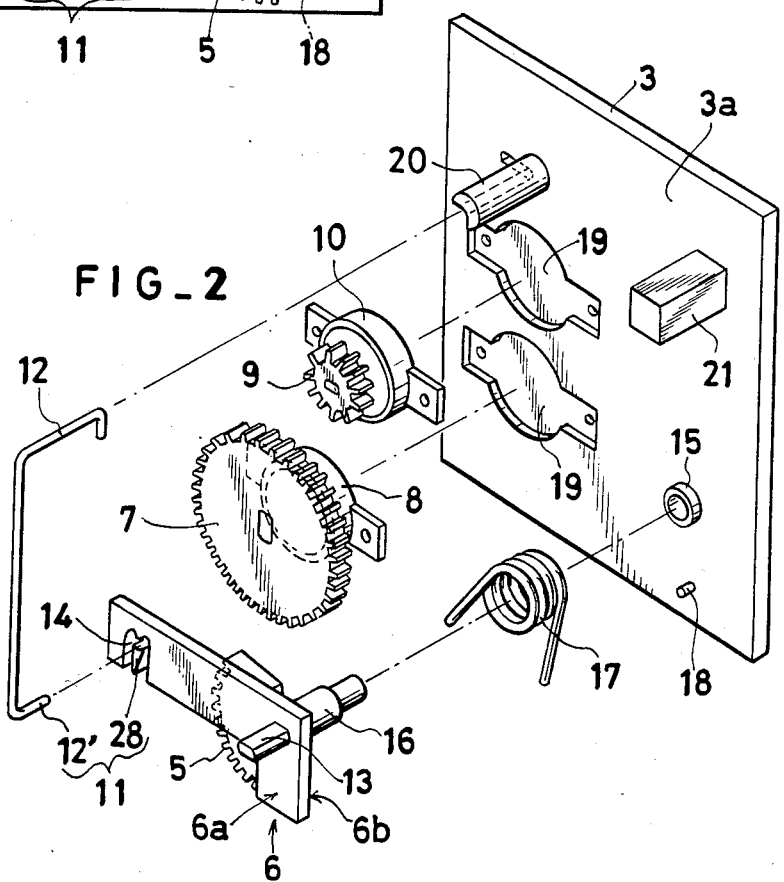

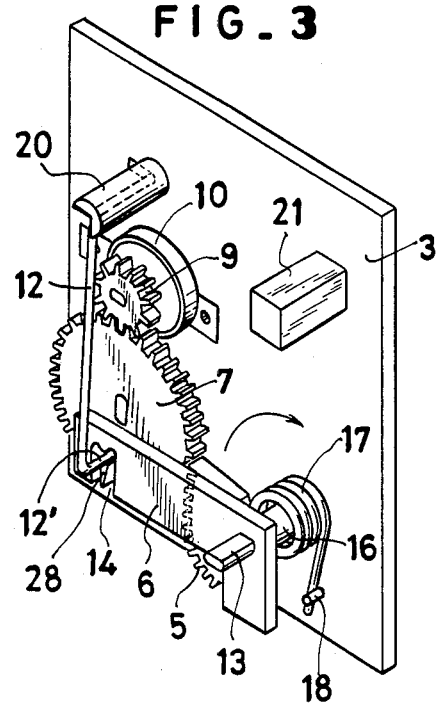
FIG_3
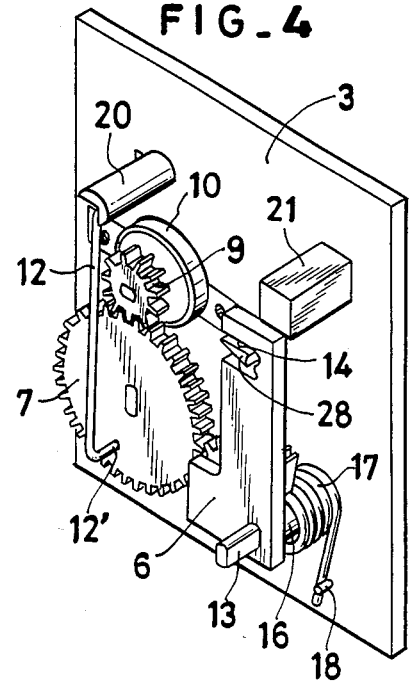
FIG_4
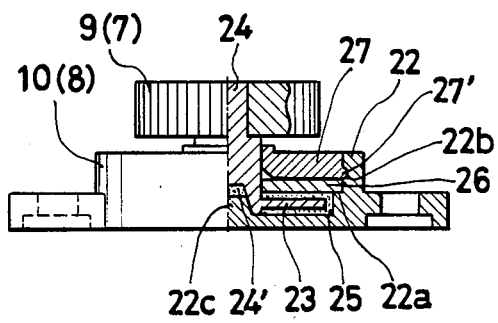
FIG_5
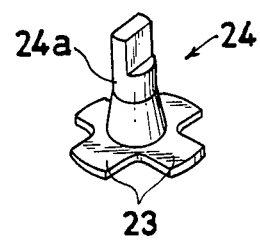
FIG_6

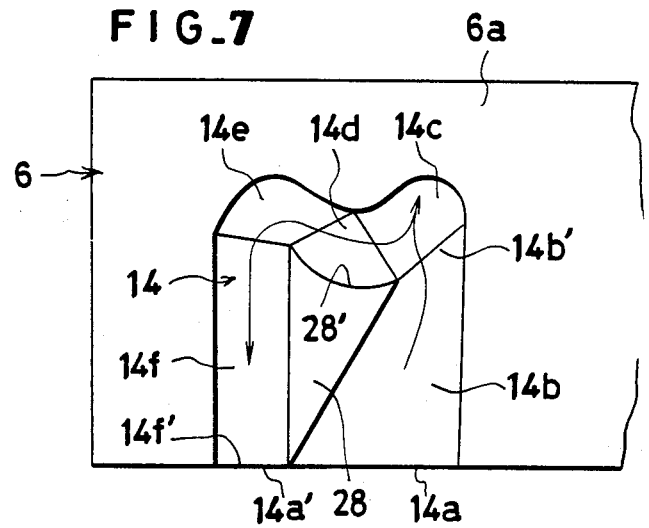
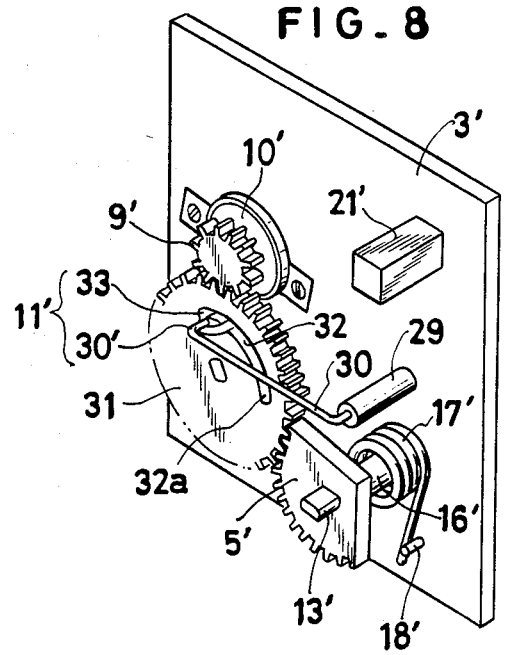

MECHANISM FOR OPENING AND CLOSING A LID

FIELD OF THE INVENTION AND RELATED ART STATEMENT

This invention relates to a mechanism for opening and closing a lid of an audio apparatus or the like, e.g., a front panel of a cassette loading section of a tape recorder or an operating section of a receiver, with rotary damper means for braking the motion of the lid.

A mechanism for opening and closing a lid, which utilizes a rotary damper for braking a lid of an audio apparatus or the like while the lid is opened and closed, is well known in the art.

Generally, the prior art opening and closing mechanism of this type uses only a single rotary damper. Therefore, for increasing the torque serving as a braking force to sufficiently brake the lid during motion thereof, a combination of a number of gears is used for increasing the braking force produced by the rotary damper.

This prior art mechanism, however, requires fine adjustment of a plurality of gears. Therefore, the work of assembly is cumbersome and the mechanism is complicated. In addition, a large number of components are employed, leading to high manufacturing cost. Further, the entire mechanism is large in size.

OBJECT AND SUMMARY OF THE INVENTION

An object of the invention is to provide a mechanism for opening and closing a lid, which can sufficiently brake a lid of an audio apparatus or the like during the opening and closing operations and is simple in construction and capable of being inexpensively manufactured.

Another object of the invention is to provide a mechanism for opening and closing a lid, which incorporates a stopper mechanism which allows the lid to be unlocked by merely pushing the lid so that it can ensure stable operation.

To attain the above objects of the invention, there is provided a mechanism for opening and closing a lid, which comprises an output gear provided on a shaft of the lid, a rotary damper having an input gear in mesh with the output gear of the lid, and an auxiliary rotary damper having an input gear in mesh with the input gear of the rotary damper or the output gear of the lid.

When a stopper mechanism locking the lid is released, the lid rotates the output gear as it is being opened by its own weight and also by a spring force. The rotation of the output gear is transmitted to the rotary damper through the input gear, while it is also transmitted to the auxiliary rotary damper via a gear. The lid is thus braked by the rotary damper and auxiliary rotary damper, so that it is opened quietly.

The lid is also braked by the two rotary dampers while it is being closed, so that it can be closed quietly.

The stopper mechanism incorporated in the opening and closing mechanism for locking the lid has a lock pin engaged in a heart-like lock groove. Thus, the lid can be readily unlocked by merely pushing. The opening and closing mechanism thus has excellent braking property, and the lid can be opened and closed conveniently.

The above and other objects and features of the invention will become more apparent from the following description when the same is read with reference to the accompanying drawings.

BRIEF DESCRIPTION OF THE DRAWINGS

FIG. 1 is a side view showing an embodiment of the mechanism for opening and closing a lid according to the invention;

FIG. 2 is an exploded perspective view of the same embodiment;

FIG. 3 is a perspective view showing the same embodiment with a lid in the closed state;

FIG. 4 is a perspective view showing the same embodiment with the lid in the open state;

FIG. 5 is a side view, partly in section, showing a rotary damper;

FIG. 6 is a perspective view showing a rotor;

FIG. 7 is an enlarged plan view showing a lock groove of a stop mechanism; and

FIG. 8 is a perspective view showing a different embodiment of the invention.

DETAILED DESCRIPTION OF THE PREFERRED EMBODIMENT

The invention will hereinafter be described with reference to one preferred embodiment of the lid opening and closing mechanism employing two rotary dampers.

Reference numeral 1 designates a housing which accommodates a mechanism section of an audio apparatus of the like. The housing 1 is open entirely or partly at the front. The opening 2 is closed by a lid 4, which is rotatably supported on a side panel which is secured to one or both sides of the opening and is adapted to be turned down to an open state.

The side panel 3 supports a plate 6 which is rotated in unison with the lid 4 and has an output gear 5, a rotary damper 8 having an input gear 7 in mesh with the output gear 5 of the plate 6, an auxiliary rotary damper 10 having a gear 9 in mesh with the input gear 7 of the rotary damper 8, and a lock pin 12 extending vertically and constituting part of a stopper mechanism 11 for locking the lid 4 in the close state.

The plate 6 is substantially L-shaped and has a non-circular shaft 13 extending from its surface 6a at its elbow. The shaft 13 is fitted in a bearing section (not shown) of the lid 4. The plate 6 has a locking groove 14 formed near the end of its elongate portion. The groove 14 surrounds a heart-like island 28, with which the lock pin 12 engages, and is open at the lower end. The plate 6 has a shaft 16 extending from the back surface 6b of its elbow. The shaft 16 is coaxial with the shaft 13 and is rotatably fitted in a boss 15 provided on a surface 3a of the side panel 3. The shaft 16 has the integral coaxial sector-shaped gear 5.

The side panel 3 has a locking projection 18 provided near the boss 15. Engaged with the lock projection 18 is an end of a coil spring 17, which provides slight torque to the plate 6 and is fitted on the shaft 16. The surface 3a of the side panel 3 is formed with recesses 19, in which bottom portions of the rotary dampers 8 and 10 are received. The side panel 3 has a support 20 which rotatably supports the lock pin 12. The pin 12 is L-shaped and has a horizontal top portion. It is supported on the support 20 such that it depends therefrom and that it can rock like a pendulum with a constant amplitude.

The side panel 3 has a stopper 21 projecting from the surface 3a and adapted to engage with the inner surface of the lid 4 to prevent the lid 4 from being pushed more than necessary when the lid 4 is closed.

The rotary dampers 8 and 10 have the same internal construction. As shown in FIGS. 5 and 6, in this embodiment the dampers have a thin disk-like base 22, which receives the lower end of a rotor 24, the lower end having a plurality of radially extending brake members 23 and being coated with high viscosity oil, e.g., silicone grease. The rotor 24 has a shaft 24a which passes through the central holes of a flexible film 26 and a cap 27. The input gear 7 or auxiliary gear 9 is secured to the top of the rotor 24.

The flexible film 26 is received on a step portion 22a of the inner periphery of the base 22. The cap 27 has an annular projection 27' formed on the outer periphery. The annular projection 27' is snap engaged in an annular groove 22b over the step portion 22a of the inner periphery of the base 22. The flexible film 26 has a recess formed at the top. When the volume of the viscous oil 25 increases with an increase in ambient temperature, the flexible film 26 is deformed to absorb the volume increase of oil 25, thereby preventing the oil from leaking to the outside along the shaft 24a of the rotor 24. The rotor 24 has a coaxial recess 24' formed at the lower end. A raised portion 22c provided at the center of the bottom of the base 22 is received in the recess 24' to prevent wobbling of the rotor 24.

The input gear 7 and auxiliary gear 9 have a different number of teeth, the gear ratio being set to 1 : 3 to increase the output torque.

In the above construction, the lock pin 12 is rotatably supported on the support 20 of the side panel 3, and the rotary damper 8 with the input gear 7 and the auxiliary rotary damper 10 with the auxiliary gear 9 are fitted in the respective recesses 19 with their gears in mesh with each other and are secured to the side panel 3 by means of an adhesive. The shaft 16 of the plate 6 with the coil spring 17 fitted thereon is pressure fitted in the boss 15 of the side panel 3 with the output and input gears 5 and 7 in mesh with each other. One end of the coil spring 17 is engaged with one side surface of the output gear 5 while its other end is engaged with the lock projection 18, so that the plate 6 is biased in the clockwise direction in FIG. 1 about the shaft 16, i.e., in the direction of opening the lid 4, by the biasing force of the coil spring 17.

The side panel 3 which is assembled in the above way is provided on one side of the opening of the housing, and another panel (not shown) is provided on the other side of the opening such that it faces the side panel 3, the other side panel having a shaft fitted in a bearing section of the lid 4.

Subsequently, the shaft 13 of the plate 6 and a rotating shaft of the other side panel are fitted in bearings provided on opposite sides of the lower end of the lid 4. The lid 4 is thus adapted to be turned down to the open state about the aforesaid shafts.

The operation of the side panel 3 with the damper mechanism having the above structure will now be described.

When the lid 4 in the open state is pushed by the hand toward the housing 1, the plate 6 is rotated in unison with the lid 4 in the counterclockwise direction in FIG. 4 to wind up the coil spring 17 in contact with one side of the output gear 5 of the plate 6. At the same time, the output gear 5 rotates the input gear 7 and the auxiliary gear 9. At this time, the brake force due to the viscosity of oil of the rotary damper 8 and auxiliary rotary damper 10 has an effect of preventing the lid 4 from being closed suddenly.

Just before the lid 4 is brought to the closed position, a bent end portion 12' of the lock pin 12 is inserted into the lock groove 14 from the lower open end 14a thereof.

The lock groove 14 is shown in detail in FIG. 7. As is shown, the lock groove 14 surrounds the heart-like island 28 and has a forward path portion 14b extending along one side of the island 22, the portion 14b communicating with the lower open end 14a, the depth of the portion 14b being progressively reduced with increasing distance from the lower open end, a forward path end portion 14c extending slightly in a curved fashion from the smallest depth end 14b' of the forward path portion 14b, the forward path end portion 14c having an increased depth, a stop portion 14d extending along an upper end portion 28' of the island 28 and slightly deeper than the forward path end portion 14c, an escapement portion 14e extending from the stop portion 14d toward the other side of the island 28 and deeper than the stop portion 14d, and a return path portion 14f extending from the escapement portion 14e along the other side of the island 28, the depth of the return path portion 14f being progressively smaller toward the lower open end 14a' which constitutes a shallowest end 14f'. Normally, the end 12' of the pin 12 faces the lower open end 14a of the lock groove 14.

The end portion 12' of the lock pin 12 reaching the lower open end 14a' of the lock groove 14, cannot enter the return path portion 14f of the lock groove 14 because of the shallowest end 14f'. Therefore, the end portion 12' proceeds along the forward path portion 14b extending from the lower open end 14a with the subsequent rotation of the plate 6. Eventually, the end portion 12' enters the forward path end portion 14c and is stopped. At this time, the lid 4 reaches a slight overshoot position beyond the closed position. When the operator closing the lid 4 senses the click engagement of the end portion 12' of the lock pin 12 in the end of the forward path end portion 14c, he releases the pushing force. As a result, the coil spring 17 which has stored a restoring force with the wind-up tends to be unwound, thus causing the movement of the end 12' of the lock pin 12 in the forward path end portion 14c.

As has been shown, the forward end portion 14c is curved with respect to the shallowest end 14b' of the forward path portion 14b, and also the forward end portion 14c is deeper than the shallowest end 14b' of the forward path portion 14b. Therefore, the end 12' of the lock pin 12 moving backwards cannot return to the forward path portion 14b, so that it falls in the stop portion 14d adjacent to and slightly deeper than the inlet of the forward path end portion 14c. Thus, the force tending to unwind the coil spring 17 is received by the upper end portion 28' of the heart-like island 28, so that the coil spring 17 is not unwound.

More specifically, when the lid 4 is pushed until reaching a slightly overshoot position from the closed position so that a click engagement is felt and the lid 4 can no longer be pushed, the lid 4 is released. As a result, the coil spring 17 is slightly unwound, causing the lid 4 to be returned to a position closing the open end 2 of the housing 1 and locking the lid 4 at that position.

To open the lid 4, the lid 4 is slightly pushed into the housing 1 from the closed state. As a result, the end 12' of the lock pin 12, which is at the stop portion 14d deeper than the forward path end portion 14c and cannot return to the portion 14c because of the depth difference, falls into the escapement portion 14e deeper than the stop portion 14d. When the lid 4 is released, the end portion 12' of the lock pin 12 proceeds from the escapement portion 14e to the return path portion 14f due to the unwinding force of the coil spring 17, so that it is ultimately detached from the groove 14 at the lower open end 14a'. Until this time, the output gear 5 rotates the gears 7 and 9. Thus, as the lid 4 turns down under its own weight, it is opened quietly owing to the brake force provided by the viscosity of the oil of the rotary damper 8 and auxiliary rotary damper 10.

As has been shown, with this embodiment when the lid 4 is pushed to a position slightly overshooting the closed position and is then released, the coil spring 17 is slightly unwound so that the end 12' of the lock pin 12 is engaged in the stop portion 14d of the lock groove 14. Then when the lid 4 in the closed state is slightly pushed, the end 12' of the lock pin 12 is detached from the stop portion 14d and moved to the escapement portion 14e, whereby the lid 4 is slightly opened by the restoring force of the coil spring 17 and turned down under its own weight so that it is opened quietly while being braked by the viscosity of the oil of the rotary damper 8 and auxiliary rotary damper 10.

The stopper mechanism 11 described above is by no means limitative. For example, it is possible to use an arrangement as shown in FIG. 8. In this instance, a lock pin 30 is supported on a support 29 of a side panel 3' such that it extends horizontally, and an end portion 30' of the lock pin 30 is engaged in a lock groove formed on the surface of an input gear 31.

The lock groove 32 is arcuate and has its center coaxial with the shaft of the input gear 31, and the rear end of the lock groove 32 with respect to the direction of rotation of the input gear 31 has a groove surrounding a heart-like island 28 like that described before.

With this arrangement, in which the opposite ends of the lock groove 32 are closed, there is no need of positioning the lock pin and lock groove with respect to each other for engagement. For this reason, the end 30' of the lock pin 30 is moved along the lock groove 32, and when the lid 4 is in the open position, the end 30' of the lock pin 30 is found at the forward end 32a of the lock groove 32 in the direction of rotation of the input gear 31. As the lid 4 is closed, the end 30' of the lock pin 30 is moved along the lock groove 32 toward the rear end thereof with the rotation of the input gear 31 and is ultimately engaged in a stop portion of the lock groove at the inner end of the heart-like island which is the rear end in the direction of rotation, whereby the lid 4 assumes the closed position. When the lid 4 in the closed state is subsequently pushed slightly, the end 30' of the lock pin 30 is detached from the stop portion and moved to an escapement portion. The end 30' of the lock pin 30 then proceeds along the lock groove 32 toward the end 32a, causing the lid 4 to be opened slightly by the restoring force of the coil spring 17'. The lid 4 is thus turned down under its own weight, and is opened quietly while it is braked by the brake forces of a rotary damper 8' and an auxiliary rotary damper 10'.

As has been described in the foregoing, according to the invention a rotary damper and one or more auxiliary dampers are provided for braking the lid as the lid is opened and closed, with the input gear of the rotary damper in mesh with the output gear of the lid and the gear or gears of the auxiliary rotary damper or dampers in mesh with either one or both of the input gear of the rotary damper and the output gear of the lid. It is thus possible to greatly improve the brake force with the combined effect of the rotary damper and auxiliary rotary damper or dampers.

Further, unlike the prior art arrangement, there is no need of using a complicated gear mechanism, so that it is possible to greatly reduce the number of components and facilitate manufacture. Further, it is possible to provide the mechanism sections and stopper mechanisms of the rotary damper and auxiliary rotary dampers on a side surface of a housing. Thus, installation space can be readily ensured, and the entire mechanism for opening and closing the lid can be made compact.

What is claimed is:

1. A mechanism for pivotal opening and closing a lid through at least substantially 90 degrees, comprising a shaft connected to and pivoting with said lid, an output gear provided on said shaft, a rotary damper having an input gear in mesh with the output gear of said lid, and at least one auxiliary rotary damper having an input gear in mesh with the input gear of said rotary damper or the output gear of said lid, the diameter of the input gear of said at least one auxiliary rotary damper being smaller than than of the input gear of said rotary damper.

2. A mechanism for opening and closing a lid according to claim 1, which further comprises a plate rotatable about the shaft of said lid and having an end portion provided with a heart-like lock groove, said plate lying in a vertical plane and having a lower end and an upper end, said lock groove having an open lower end at the lower end of the plate and having a stop potion at the upper end, and a lock pin for entering said lock groove from the lower open end thereof to be locked in said stop portion when closing said lid by pushing thereon, said lock pin being unlocked from said stop portion to clear said lock groove from the lower open end thereof when said lid is pushed again.

3. A mechanism for opening and closing a lid according to claim 1, wherein each of said rotary damper and auxiliary rotary dampers includes an internally accommodated brake member coated with viscous oil, the input gear being secured to a shaft portion of said brake member.

4. A mechanism for opening and closing a lid according to claim 1, wherein the input gear of said rotary damper is provided with a lock groove, one end of said lock groove being provided with a heart-like groove having a stop portion, and which further comprises a lock pin for being locked in said stop portion of said lock groove when said lid is closed, said lock pin being unlocked from said stop portion to clear said lock groove from the lower open end thereof when said lid is pushed again.

5. A mechanism for opening and closing a lid according to claim 1, which further comprises a spring fitted on the shaft of said lid and biasing said lid in the direction of opening said lid.

* * * * *